(12) United States Patent
Antoine et al.

(10) Patent No.: US 8,169,479 B2
(45) Date of Patent: May 1, 2012

(54) DEVICE FOR SCANNING ACQUISITION OF A DIGITAL IMAGE WITH PASSIVE STABILIZATION

(75) Inventors: Jacques Antoine, Montigny le Bretonneux (FR); Remi Charasse, Cachan (FR)

(73) Assignee: Thales (FR)

( * ) Notice: Subject to any disclaimer, the term of this patent is extended or adjusted under 35 U.S.C. 154(b) by 1294 days.

(21) Appl. No.: 11/816,413

(22) PCT Filed: Feb. 13, 2006

(86) PCT No.: PCT/EP2006/050878
§ 371 (c)(1),
(2), (4) Date: Aug. 15, 2007

(87) PCT Pub. No.: WO2006/087307
PCT Pub. Date: Aug. 24, 2006

(65) Prior Publication Data
US 2008/0259168 A1    Oct. 23, 2008

(30) Foreign Application Priority Data
Feb. 15, 2005    (FR) .................................. 05 01520

(51) Int. Cl.
*H04N 7/18*    (2006.01)

(52) U.S. Cl. .......................................................... 348/144
(58) Field of Classification Search .................. None
See application file for complete search history.

(56) References Cited

U.S. PATENT DOCUMENTS

| | | | |
|---|---|---|---|
| 5,798,786 A * | 8/1998 | Lareau et al. .................. | 348/144 |
| 6,020,956 A * | 2/2000 | Herman et al. ........... | 356/139.01 |
| 6,473,119 B1 | 10/2002 | Teuchert | |
| 6,654,126 B1 * | 11/2003 | Ohsawa ......................... | 356/461 |
| 6,993,111 B1 * | 1/2006 | Annis .............................. | 378/57 |
| 2002/0163582 A1* | 11/2002 | Gruber et al. .............. | 348/218.1 |
| 2003/0117493 A1* | 6/2003 | Holdaway et al. ............. | 348/144 |

FOREIGN PATENT DOCUMENTS
FR    2 595 817    9/1987

* cited by examiner

*Primary Examiner* — Moustafa M Meky
*Assistant Examiner* — Clayton R Williams
(74) *Attorney, Agent, or Firm* — Lowe Hauptman Ham & Berner, LLP

(57) ABSTRACT

Device for scanning acquisition of a digital image by means of a photosensitive linear detector (11). The device is able to undergo movements perpendicular to the scanning direction. The device also includes two other photosensitive linear detectors (12, 13). The three photosensitive linear detectors being placed so that the detection is carried out substantially along a U.

16 Claims, 5 Drawing Sheets

FIG.3a
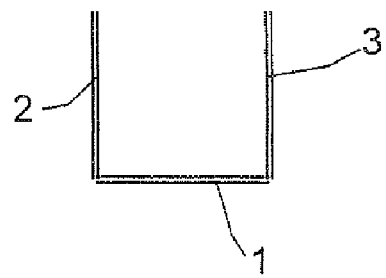
FIG.3b
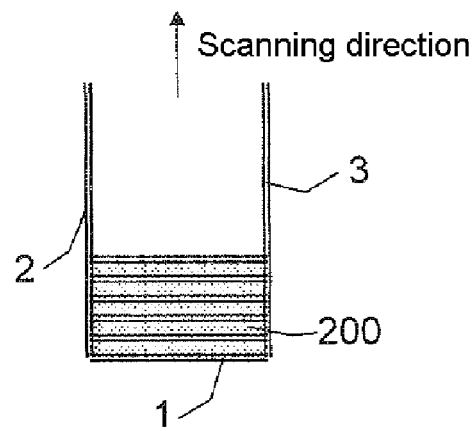
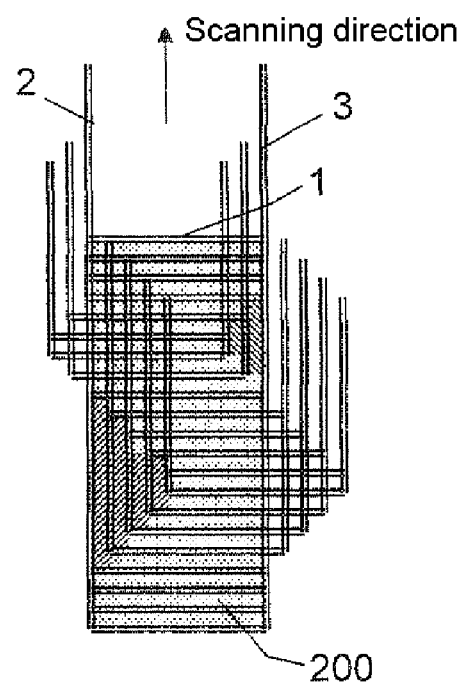
FIG.4a
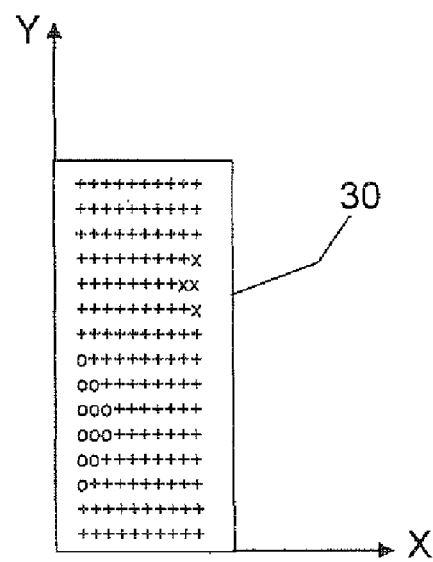
FIG.4b

DEVICE FOR SCANNING ACQUISITION OF A DIGITAL IMAGE WITH PASSIVE STABILIZATION

CROSS REFERENCE TO RELATED APPLICATIONS

The present Application is based on International Application No. PCT/EP2006/050878, filed Feb. 13, 2006 which in turn corresponds to France Application No. 05 01520, filed Feb. 15, 2005 and priority is hereby claimed under 35 USC §119 based on these applications. Each of these applications are hereby incorporated by reference in their entirety into the present application.

TECHNICAL FIELD

The invention relates to the scanning acquisition of a large digital image, for example onboard an aircraft, a ship or more generally a moving platform.

BACKGROUND OF THE INVENTION

This image acquisition is conventionally performed using a device fitted with a silver film of large dimensions, typically 60 mm×60 mm or 114 mm×114 mm and up to 230 mm×230 mm, and means for taking a photograph with exposure times between $\frac{1}{100}$ and $\frac{1}{1000}$ s.

This type of device may be replaced with an electronic device, which is less expensive in terms of operational infrastructure and easier to use. Such an electronic device installed for example onboard an aircraft conventionally comprises a linear array of photodiodes, for example 114 mm in length, placed perpendicular to the direction of movement of the aircraft. The image is obtained by scanning, that is to say during movement of the aircraft, the image being acquired in "push-broom" mode. To obtain an image measuring 114 mm×114 mm, a scanning time of about 10 s is required.

However, the aircraft is subjected to various movements during these 10 s and especially rotational movements perpendicular to the scanning direction (roll), which causes lateral distortion of the image, sometimes making it illegible. This lateral distortion is illustrated schematically in FIG. 1. This figure shows the projection of the linear array 1, which as the scanning proceeds undergoes displacements perpendicular to the scanning direction, the initially intended field 100, which has the shape of a strip, and the recorded image 200 (shaded gray), in which image 200 there are missing regions 300.

One method commonly used to remedy this problem is to stabilize the device, while an image is being taken, by means of optomechanical gyrostabilization of the line of sight. Another method, applied after an image has been taken, is to bring the lines back into mutual register by means of an algorithm so as to obtain an exploitable image, but this consequently has a reduced field of view.

SUMMARY OF THE INVENTION

The invention proposes a device comprising three linear detectors arranged in a U.

When the device undergoes movements perpendicular to the scanning direction, the lateral detectors take over ahead of time from the central detector, thus making it possible to form an image of the entire initially intended field.

More precisely, one subject of the invention is a device for scanning acquisition of a digital image by means of a photosensitive linear detector, the device being able to undergo movements perpendicular to the scanning direction, characterized in that it further includes two other photosensitive linear detectors, the three photosensitive linear detectors being placed so that the detection is carried out substantially along a U.

According to one feature of the invention, said device includes means for determining the angular velocity and the angular position of the device and means for timing this angular velocity, this angular position and the signals output by the linear detectors; it also includes a digital image memory comprising pixels from a detector determined by these means.

This device thus makes it possible for the movements perpendicular to the scanning direction to be electronically compensated, with neither optomechanical gyrostabilization nor loss of image information in the initially intended field.

Preferably, it includes at least one plane mirror associated with a detector and oriented so as to allow optical projection of the detector in perpendicular alignment with the end of the adjacent detector. The mirror is for example oriented at about 45° to the plane of the detector.

Advantageously, it includes semireflecting plates located respectively at the end of the mirror(s) so that the end of a detector is aimed at the same object point as the end of the adjacent detector in order to avoid any discontinuity in the acquired image.

Another subject of the invention is a system for acquisition of an image in push-broom mode or in "panoramic surveillance" mode, characterized in that it includes a device as described.

BRIEF DESCRIPTION OF THE DRAWINGS

Other features and advantages of the invention will become apparent on reading the detailed description that follows, given by way of nonlimiting example and with reference to the appended drawings, in which:

FIGS. 3a and 3b show schematically the projection of the push-broom linear array 1 and lateral linear arrays 2 and 3 respectively at a time t and undergoing displacement without any movement other than that of the displacement;

FIGS. 4a and 4b illustrate schematically the filling of the image memory of the device by the three linear arrays, after a scan of a certain duration, during which the device has undergone movements perpendicular to the scan direction;

FIG. 7 show schematically an example of the arrangement of the linear arrays of photodiodes according to the invention.

When going from one figure to another, identical elements have the same references.

DETAILED DESCRIPTION

The device according to the invention comprises three linear detectors arranged approximately in the form of a U.

Figure 2:
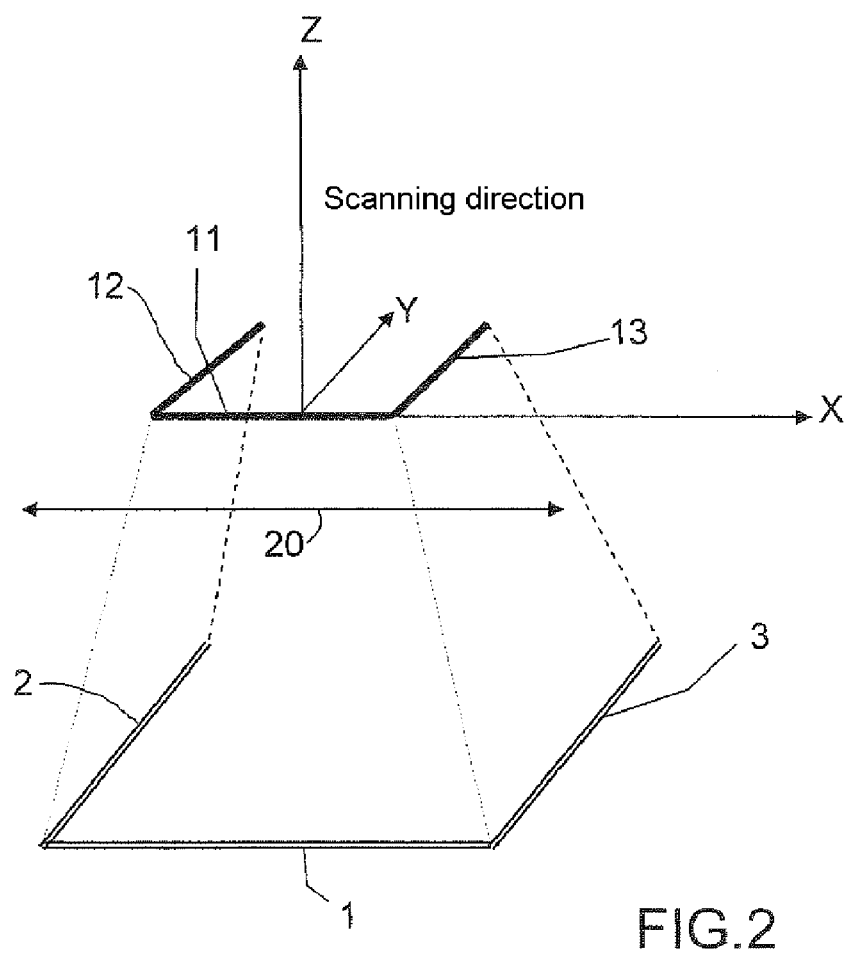
FIG. 2 shows a perspective view of one example of a device according to the invention.

These detectors are, for example, linear arrays of photodiode. FIG. 2 shows a perspective view of this device, which comprises a central "push-broom" array 11, two lateral arrays 12, 13 and the projection 1, 2 and 3 of these detectors on the ground through a conventional optic 20.

The invention will now be described more particularly in the case of scanning image acquisition onboard an aircraft.

The image is usually produced in push-broom mode: one dimension of the image is obtained by the projection of the push-broom array, while the second dimension of the image is obtained by the displacement of the device integral with the aircraft. FIGS. 3a and 3b illustrate schematically the projection of the push-broom array 1 and lateral arrays 2 and 3 respectively at a time t and undergoing displacement in which the device is not subjected to movements other than that of the displacement. The image (shown shaded gray) is that obtained by the push-broom linear array—it corresponds entirely to the intended field.

Figure 1:
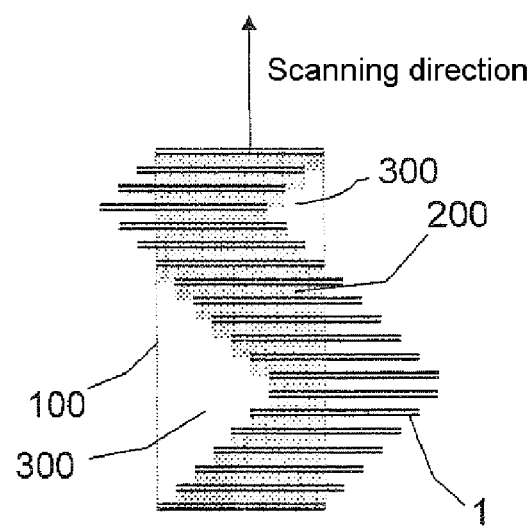
FIG. 1, already described, shows schematically an example of lateral image distortion.

When undergoing a movement perpendicular to the scanning direction of the push-broom linear array, such as for example a roll movement, the lateral arrays perform the acquisition, in a panoramic-type mode, of what the push-broom array can no longer image due to its offset relative to the initial line of sight. The lateral arrays make it possible to fill in the missing regions 300 shown in FIG. 1, and thus to obtain an image corresponding entirely to the intended field.

It should be recalled that the photonic signal picked up by the photodiodes is converted into an electrical signal, which feeds an image memory comprising pixels. FIGS. 4a and 4b illustrate the filling of the image memory of the device by the three linear arrays. FIG. 4a shows schematically the projection of the push-broom array 1 and the lateral arrays 2 and 3 undergoing displacement in which the device is subjected to movements perpendicular to that of the displacement. The memory 30 shown in FIG. 4b is filled progressively with the arrival of the rows of pixels. The regions scanned in panoramic mode by the projections of the left 2 and right 3 lateral arrays are represented by "o" and "x" symbols respectively. The regions scanned in push-broom mode by the projection of the push-broom array 1 are shown by "+" symbols. The image obtained is that of the entire initially intended field. The central pixel of the resulting image always represents the center of the initially intended field in the absolute reference frame.

When there is no perpendicular movement, only the linear array in push-broom mode is able to construct an image—the pixels of one row all come from the push-broom array, that is to say they are all obtained at the same time.

Figure 5:
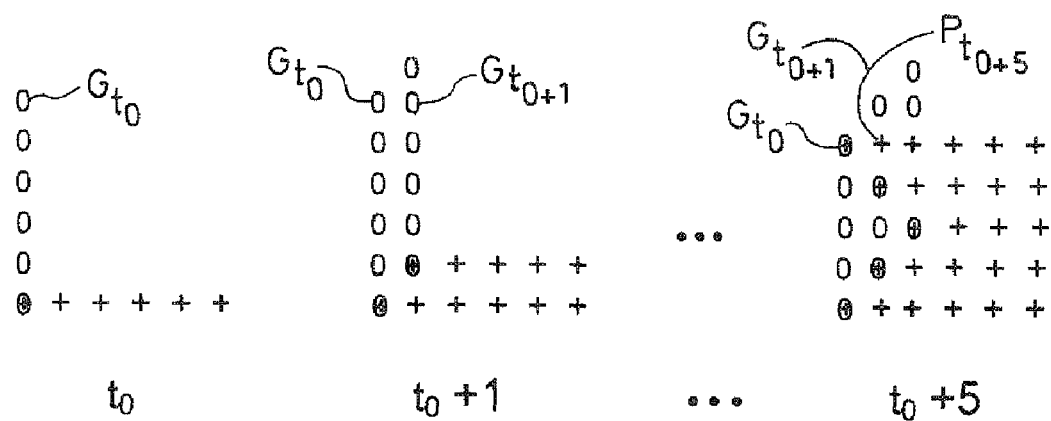
FIG. 5 illustrates schematically the filling of the image memory of the device at various times during the scan.

When the lateral arrays are contributing, the pixels of one row are not all obtained at the same time. This is illustrated in FIG. 5 as an example of filling the memory 30 at times t0, t0+1, . . . , t0+5 when the pixels coming from the push-broom array were formed in succession. At t0, the push-broom array undergoes a first shift to the right, and therefore the left-hand lateral array is contributing. At t0+1, the push-broom array undergoes a second shift in the same direction. At t0+5, the push-broom array has finally undergone three shifts to the right and returned to its reference position because of two shifts to the left. The pixel $P_{t0+5}$ corresponds to an image point formed at time t0+5 by the push-broom array, while the pixel $L_{t0}$, which comes from the left-hand lateral array, corresponds to an image point formed at time t0. The pixels of this row therefore have not all been obtained at the same time. The problem is identical in the case of pixels coming from the right-hand lateral array. Furthermore, the pixel $L_{t0+1}$ corresponds to an image point formed at time t0+1 by the left-hand lateral array. It is preferably replaced, as illustrated in the figure, with the pixel $P_{t0+5}$, which corresponds to an image point formed at time t0+5 by the push-broom array, since the information $P_{t0+5}$ is more recent than $L_{t1}$. Alternatively, it may be decided to give preference to the information $L_{t1}$ acquired first relative to the subsequent information $P_{t0+5}$: in this case, the pixel $P_{t0+5}$ is ignored in favor of the pixel $L_{t0+1}$. Certain pixels are represented by "o" and "+" symbols in accordance with one particular embodiment with semitransparent plates, described in relation to FIG. 7b.

To reconstruct the image, it is therefore necessary to determine which linear array provides a pixel and to time it. The array is for example determined according to its position (or more generally that of the device) relative to a reference position. This reference position is that of the device when it is not undergoing movements perpendicular to the scanning direction. When the position is offset, for example because of the roll, this offset is then determined according to information coming from a gyroscope. This positional information also includes the time at which it was provided, so as to be able to associate it with the corresponding pixel.

Reconstruction of the image therefore means that the signals coming from each linear array and those coming from the gyroscope have to be timed. An algorithm locates each pixel in the buffer memory according to these items of information.

Figure 6:
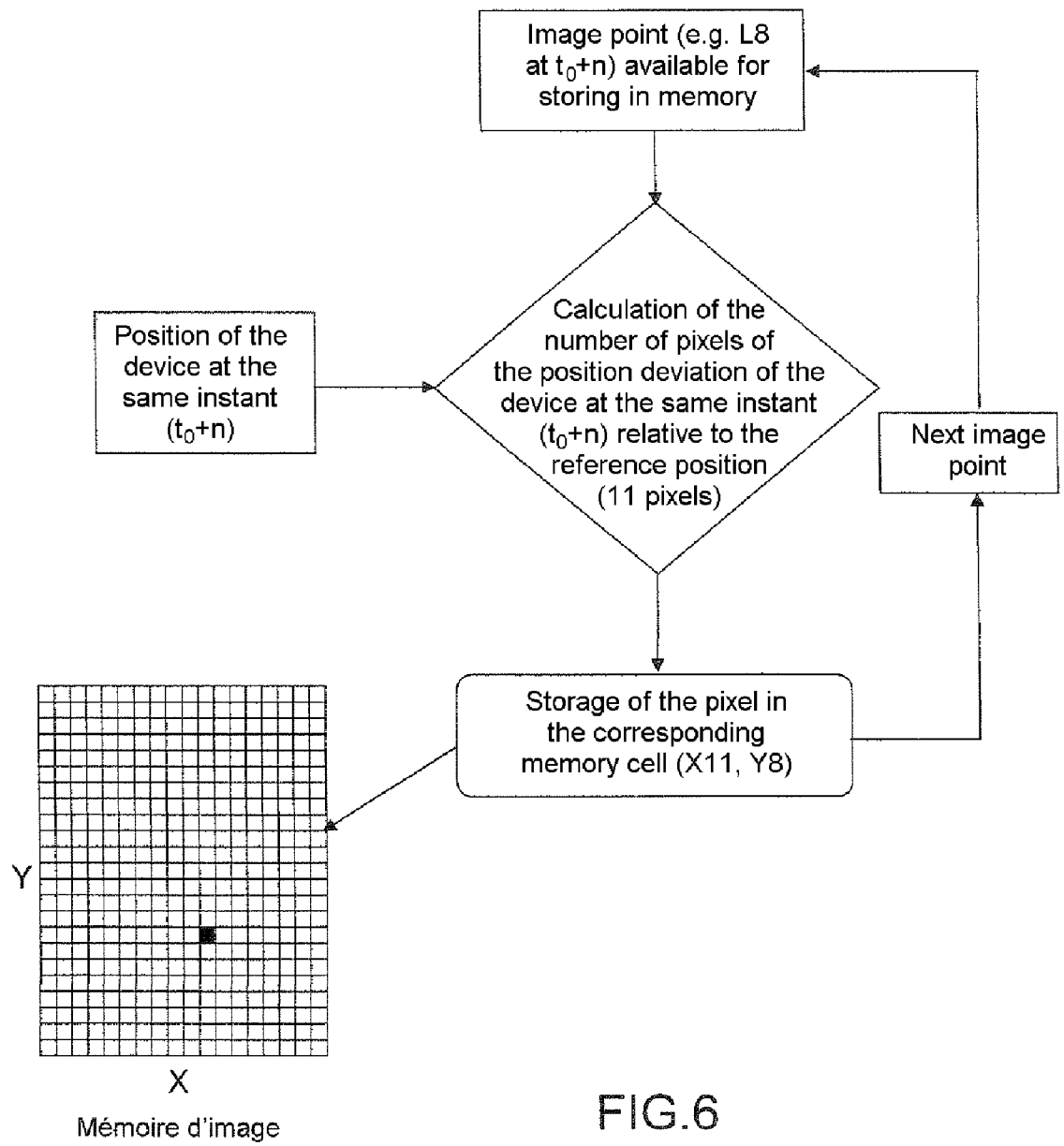
FIG. 6 illustrates schematically an example of a flowchart for filling the image memory of the device.

An example of a flowchart is shown in FIG. 6. An image point coming from the 8th photodiode of the left-hand array (L8) and recorded at time $t_{0+n}$ is intended to be stored in memory as a pixel. This pixel has the coordinates (X, Y) in memory. In our example, Y=8. X is determined by calculating the difference in position between the device and the reference position at time t0+n. For example, X=11 is obtained. The pixel is then stored in memory at (X, Y). The same procedure is then repeated for the next image point.

Figure 7A:
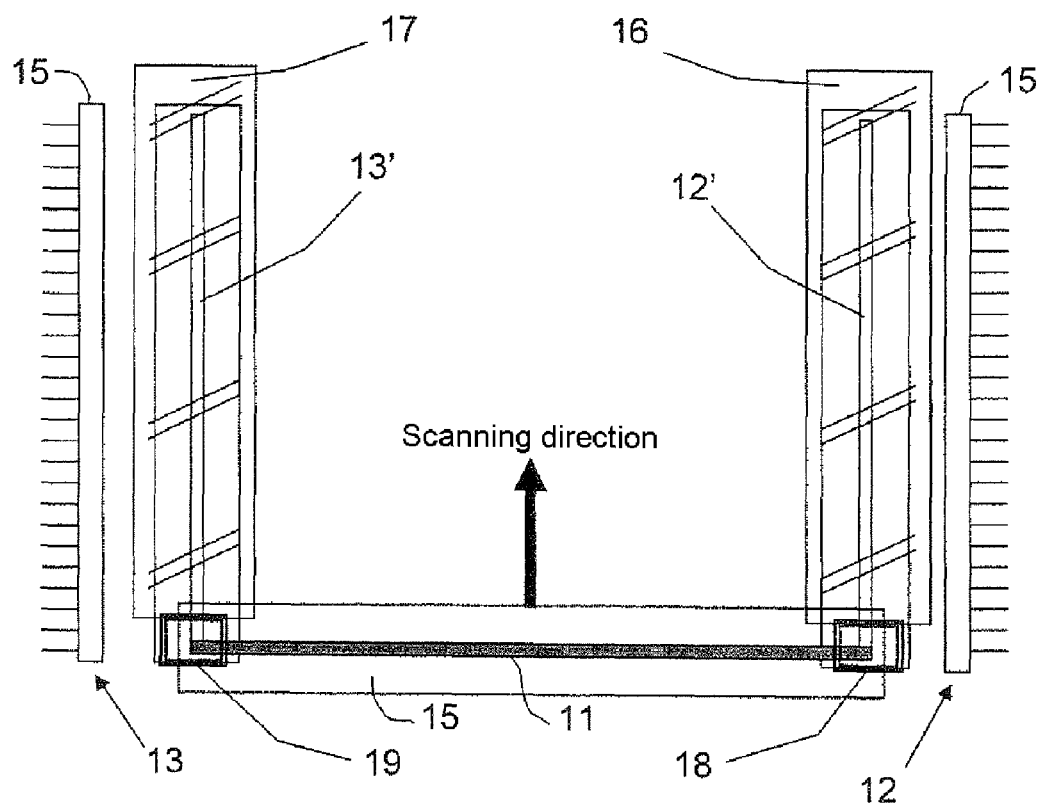
FIG. 7a is a projection of the linear arrays in an XY plane indicated in FIG. 2.
Figure 7B:
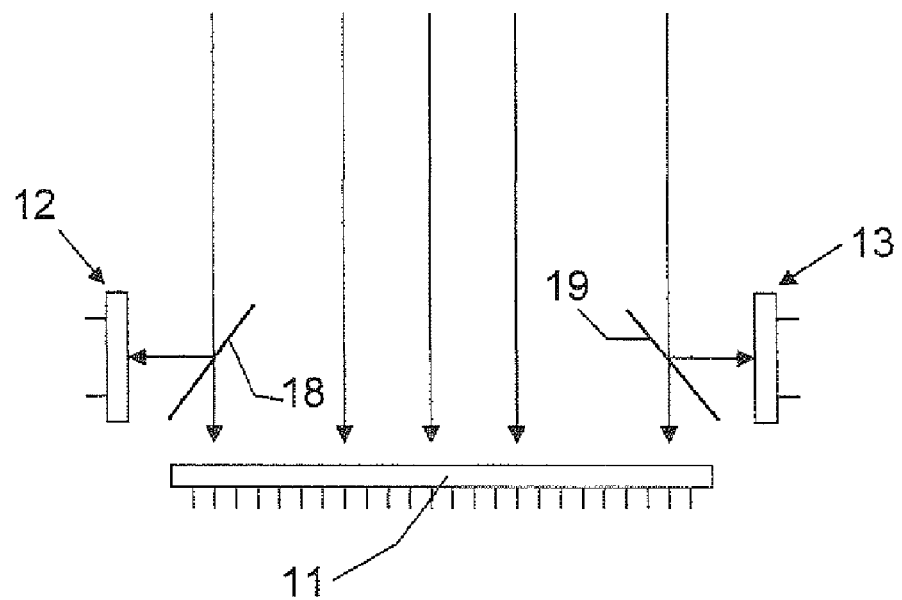
FIGS. 7b and 7c are projections of the linear arrays in an XZ plane, with Y=0 in the case of FIGS. 7b and Y>0 in the case of FIG. 7c.
Figure 7C:
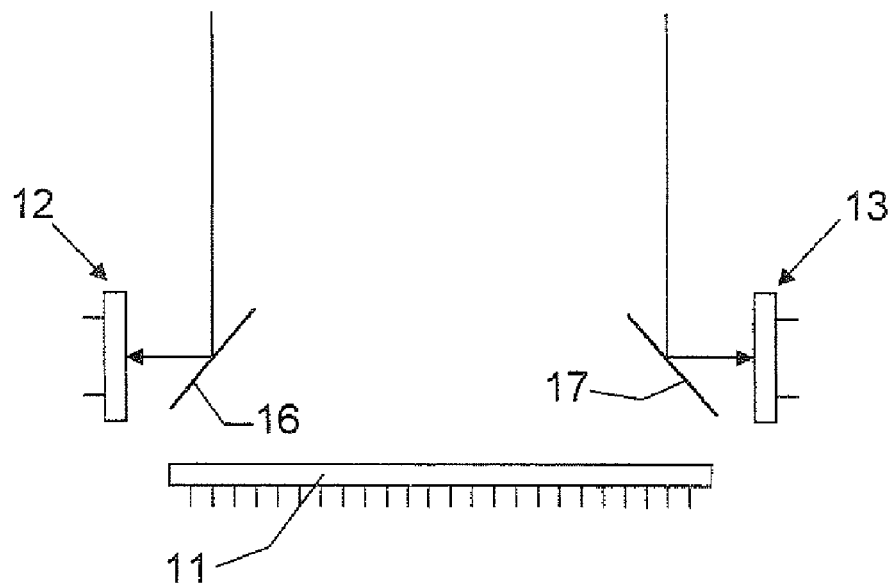

The arrangement of the linear arrays will now be described in greater detail in relation to FIG. 7. These figures are projections in planes of the XYZ reference frame indicated in FIG. 2. FIG. 7a is a projection of the arrays in an XY plane; FIGS. 7b and 7c are projections of the arrays in an XZ plane, with Y=0 in the case of FIG. 7b and Y>0 in the case of FIG. 7c. In FIGS. 7b and 7c, the rays coming from object points are shown. A linear array of photodiodes 11 shown in FIG. 7a is in fact inserted in a support 15. This support is wider and longer than the photodiodes themselves. Thus, when the supports are arranged in the form of a U in the same plane, the arrays of photodiodes are not touching, even when the supports are touching.

This is why firstly the lateral arrays 12 and 13, for example of the same length, are turned through 90°, the photodiodes of one array facing the photodiodes of the other and offset from the push-broom array, as indicated in FIG. 7. Adjustable mirrors 16, 17 are then placed parallel to the lateral arrays and oriented so as to allow the optical projection of each lateral array in perpendicular alignment with the ends of the adjacent push-broom array. Said mirrors are oriented at about 45°. In this case, the arrays 11, 12 and 13 are not arranged in a U in the same plane, but are arranged so that detection is performed along a U.

Hitherto, the linear arrays have been considered to be arranged in a U, or more generally that detection is performed along a U, the lateral arms of the U being perpendicular to the arm of its base. In practice, a certain tolerance on this perpendicularity is permitted.

Preferably, semireflecting plates 18, 19 are placed at the end of the respective mirrors 16, 17 so that the end of a linear array is aimed at the same object point as the end of the adjacent array so as to avoid a discontinuity in the image acquired. The semitransparent plates provide a perfect junction of the image acquisition system in the optical field. In this embodiment, the corresponding pixels are shown in FIG. 5 both by "o" and "+" symbols.

According to a first embodiment, it is possible to project the image from the lateral arrays at the ends of the push-broom array and thus use two mirrors (one per lateral array). This is the example shown in FIG. 7. According to another embodiment, the image from the push-broom array at the ends of the lateral arrays is projected and thus a single mirror is used. This mirror is then provided with semireflecting plates at its two ends.

A device according to the invention has been produced with three identical linear arrays each having the following characteristics:

12000 photodiodes;
size of a photodiode: 6.5 μm×6.5 μm;
length: 78 mm;
76 pairs of rows/mm;
IFOV (Instantaneous Field of View): 21 μrad for the required 300 mm focal length;
intended total field: 260 mrad (14.8°) for the 300 mm focal length;
minimum row period: 600 μs; and
dynamic range, i.e. the output amplitude of the array with respect to the noise: 1000/1.

This detector best approaches the characteristics of a silver film.

The invention has been described in the case of scanning image acquisition onboard an aircraft.

The device may also be installed onboard a ship equipped with a panoramic surveillance system, that is to say an image acquisition system that rotates about a vertical axis of a vertical array. This system is also subjected to movements perpendicular to the scanning direction, at the mercy of the ship's rolling or pitching action.

Likewise, it may be installed onboard a terrestrial vehicle fitted with a panoramic surveillance system subjected to movements perpendicular to the scanning direction, due for example to bumps in the road.

The invention claimed is:

1. A device for scanning acquisition of a digital image comprising:
   first photosensitive linear detector means wherein, the device being able to undergo movements perpendicular to a scanning direction;
   a second photosensitive linear detector and a third photosensitive linear detector, the three photosensitive linear detectors being arranged substantially in a U-shape;
   a gyroscope configured for determining an angular velocity and an angular position of the device;
   a calculation device configured for timing the angular velocity and the angular position and signals output by the linear detectors; and
   a digital image memory comprising pixels configured for storing signals from the linear detectors at a position determined by the timing of the angular velocity and the angular position.

2. The device as claimed claim 1, further comprising at least one plane mirror associated with one of the second photosensitive linear detector and the third photosensitive linear detector and oriented so as to allow optical projection of the said detector in perpendicular alignment with the end of the adjacent first photosensitive linear detector.

3. The device as claimed in claim 2 wherein the least one plane mirror is oriented at about 45° to the plane of the second photosensitive linear detector with which said mirror is associated.

4. The device as claimed in claim 2, wherein the at least one plane mirror is oriented at about 45° to the plane of the third photosensitive linear detector with which said mirror is associated.

5. The device as claimed in claim 2, wherein the at least one plane mirror comprises a semireflecting plate.

6. The device as claimed in claim 1, wherein the second photosensitive linear detector and the third photosensitive linear detector have the same length.

7. A system for acquisition of an image in push-broom mode, including a device as claimed in claim 1.

8. The system as claimed in claim 7, further comprising at least one plane mirror associated with one of the second photosensitive linear detector and the third photosensitive linear detector and oriented so as to allow optical projection of the said detector in perpendicular alignment with the end of the adjacent first photosensitive linear detector.

9. The system as claimed in claim 8, wherein the least one plane mirror is oriented at about 45° to the plane of the second photosensitive linear detector or the third photosensitive linear detector with which said mirror is associated.

10. The system as claimed in claim 8, wherein the at least one plane mirror comprises a semireflecting plate.

11. The system as claimed in claim 7, wherein the second photosensitive linear detector and the third photosensitive linear detector have the same length.

12. A system for acquisition of an image in "panoramic surveillance" mode, including a device as claimed in claim 1.

13. The system as claimed in claim 12, further comprising at least one plane mirror associated with one of the second photosensitive linear detector and the third photosensitive linear detector and oriented so as to allow optical projection of the said detector in perpendicular alignment with the end of the adjacent first photosensitive linear detector.

14. The system as claimed in claim 13, wherein the least one plane mirror is oriented at about 45° to the plane of the second photosensitive linear detector with which said mirror is associated.

15. The system as claimed in claim 13, wherein the at least one plane mirror is oriented at about 45° to the plane of the third photosensitive linear detector with which said mirror is associated.

16. The system as claimed in claim 12, wherein the at least one plane mirror comprises a semireflecting plate.

* * * * *